April 8, 1952 J. M. CLUWEN 2,591,917

DEMODULATOR

Filed May 16, 1950

INVENTOR.
JOHANNES MEYER CLUWEN
BY Fred M. Vogel
AGENT

Patented Apr. 8, 1952

2,591,917

UNITED STATES PATENT OFFICE 2,591,917

DEMODULATOR

Johannes Meyer Cluwen, Eindhoven, Netherlands, assignor to Hartford National Bank and Trust Company, Hartford, Conn., as trustee Application May 16, 1950, Serial No. 162,286
In the Netherlands June 9, 1949

3 Claims. (Cl. 250—27)

This invention relates to a push-pull demodulator for frequency-modulated oscillations.

For demodulating frequency-modulated oscillations it is known to use a push-pull demodulator of the type comprising two coupled circuits which are tuned to the central frequency of the oscillation to be demodulated and from which two oscillations are taken that are push-pull amplitude-modulated in accordance with the intelligence (i. e. that the modulations are substantially equal and in phase-opposition), and furthermore comprising two amplitude-detectors by means of which these amplitude-modulated oscillations are demodulated.

According to the present invention, such a push-pull demodulator is characterized in that the demodulated oscillation produced in the output of the first amplitude detector is supplied, together with the other amplitude-modulated oscillation, to the series-connection of an auxiliary rectifier, being non-conductive during part of the cycle of this oscillation, and an impedance, across which an oscillation is produced which is amplitude-modulated in accordance with the intelligence and demodulated by means of the second amplitude detector.

In order that the invention may be readily carried into effect an example will now be described in detail with reference to the accompanying drawings, of which:

Figure 1:
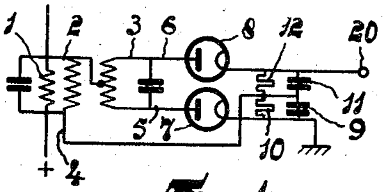
Fig. 1 shows a known push-pull demodulator of the type referred to above.
Figure 2:
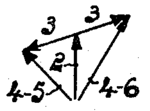
Fig. 2 is a vector diagram.

In the circuit of Fig. 1, the frequency-modulated oscillation required to be demodulated (input-oscillation) is fed by way of a coupling coil 1 to two coupled circuits 2 and 3 which are tuned to the central frequency of the input oscillation and across which voltages corresponding to the vectors 2 and 3 of Fig. 2 are produced. In this manner, two amplitude-modulated oscillations corresponding to vectors 4—5 and 4—6 are produced between points 4—5 and 4—6, of which oscillations the amplitude modulations correspond to the frequency modulation of the input oscillation i. e. to the intelligence and are substantially equal and in phase-opposition. These two amplitude-modulated oscillations are supplied to two amplitude detectors comprising rectifiers 7, 8 and the resistance-capacity combinations 9—10 and 11—12 across which demodulated oscillations are produced. These are added in the manner shown in the drawing, the desired demodulated oscillation (intelligence) being subsequently taken from the output terminal 20. Demodulation distortion due to the non-linear relationship between the amplitude modulation of the two oscillations 4—5, 4—6 and the frequency deviation of the input oscillation in accordance with the intelligence, will partly compensate each other in such a sense that no further even harmonics occur in the oscillations taken from the terminal 20.

This known circuit suffers from the disadvantage that if the cathode of the rectifier 7 is connected to earth, the cathode of the rectifier 8 is earthed by way of the filter 9, 10, 11, 12 constituting a high impedance with respect to low frequencies. If the filament of the rectifier 8 is fed with alternating current, an undesired hum voltage corresponding to the alternating supply voltage will be produced across the filter 9, 10, 11, 12 due to the internal filament-cathode capacity.

According to the invention this hum can be avoided.

Figure 3:
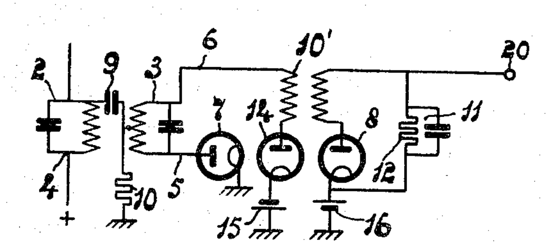
Fig. 3 represents a circuit-arrangement according to the invention.
Figure 4:
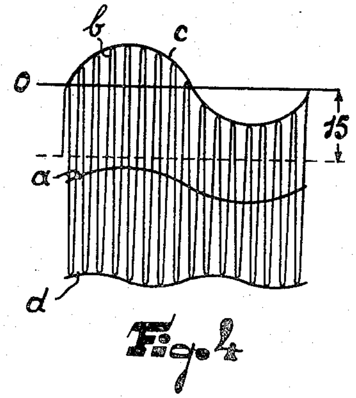
Fig. 4 shows a voltage-time diagram used in describing the operation of the circuits.

In the circuit of Fig. 3, the oscillation to be demodulated (input oscillation) is again supplied to the coupled circuits 2, 3 tuned to the central frequency of the input oscillation the oscillation amplitude-modulated in accordance with the intelligence between points 4 and 5, which oscillation corresponds to the vector 4, 5 of Fig. 2, is again demodulated by means of the first amplitude detector 7—9—10. Consequently, a voltage corresponding to the intelligence and having the shape of curve *a* in Fig. 4 is produced across the capacitor 9 of the said amplitude detector. The upper end 6 of the circuit 3 consequently shows a voltage variation with respect to earth as shown by curve *b* of Fig. 4. The envelope *c* of the said voltage *b* corresponds to the desired demodulated signal, the enveloping curve *d* corresponding to the even-harmonics-distortion. The voltage *b* is fed to the series-connection of the impedance 10′ and an auxiliary rectifier 14, provision being made by means of a bias 15, for example the automatic gain-control voltage of a receiver, or a voltage deduced by means of a smoothing filter from the voltage across the resistance 10 that the voltage produced across the impedance 10′, which voltage is shaped as that portion of curve *b* projecting above the broken line corresponding to the bias 15, has an amplitude invariably corresponding to the intelligence. This voltage is subsequently detected by means of the second amplitude-detector 8—11—12. The impedance 10' may be an intermediate frequency transformer, an inductance, or a tuned circuit. In the last-mentioned cases this impedance and the auxiliary rectifier 14 should change places.

The value of the voltage source 15 determines the direct voltage level of the output voltage. If desired, its influence may be compensated by a voltage source 16 having the same value but being oppositely connected.

As appears from the circuit arrangement, the cathodes of all rectifiers may be earthed, at least with respect to frequencies of the intelligence oscillation, so that no undesired hum voltage from the filament supply of the rectifiers is produced in the output of the demodulator. If desired, the transformer 10' and the rectifier 14 may be interchanged in Fig. 3.

What I claim is:

1. A push-pull demodulator for demodulating an incoming carrier wave frequency modulated by an intelligence signal, said demodulator comprising first and second circuits tuned to the central frequency of said wave, said first and second circuits being intercoupled, one end of the first circuit being connected to said second circuit at a point intermediate the ends thereof, first and second amplitude detectors, a series network including an impedance and a rectifier, means to supply said frequency modulated wave to said first circuit to produce at respective ends of said second circuit first and second oscillations in phase opposition which are amplitude modulated in accordance with said signal, means coupled to one end of said second circuit to supply said first oscillations to said first detector whereby said first oscillations are demodulated, means coupled to the other end of said second circuit and to said first detector to supply said demodulated first oscillations and said second oscillations to said series network, means biasing said rectifier to an extent at which said rectifier is rendered conductive during a part of the cycle of oscillations applied thereto whereby produced across said impedance are third oscillations amplitude modulated in accordance with said signal, and menas coupled to said impedance to supply said third oscillations to said second detector whereby said frequency modulated carrier wave is demodulated.

2. A demodulator as set forth in claim 1 wherein each detector includes an electron discharge tube having an anode, an indirectly heated cathode and a filament therefor, and means to supply filament current to said filament, said cathode being grounded for all frequencies of said intelligence signal.

3. A demodulator as set forth in claim 2, further including a capacitance inserted in the connection between said one end of the first circuit and said intermediate point of said second circuit, means to supply a first constant potential through the tube of said first detector to said one end of said second circuit, and means to supply a second potential through said series network to the other end of said second circuit, said second potential having a value which is negative with respect to the value of said first potential.

JOHANNES MEYER CLUWEN.

REFERENCES CITED

The following references are of record in the file of this patent:

UNITED STATES PATENTS

| Number | Name | Date |
|---|---|---|
| 2,267,453 | Foster | Dec. 23, 1941 |
| 2,296,056 | Roberts | Sept. 15, 1942 |